United States Patent [19]

Butler

[11] Patent Number: 4,784,024
[45] Date of Patent: Nov. 15, 1988

[54] SPACERS FOR INSULATION CUTTERS

[75] Inventor: John D. Butler, New Berlin, Wis.

[73] Assignee: Mechtrix Corporation, Menomonee Falls, Wis.

[21] Appl. No.: 41,114

[22] Filed: Apr. 22, 1987

[51] Int. Cl.[4] .............................................. H02G 1/12
[52] U.S. Cl. ...................................................... 81/9.51
[58] Field of Search ................................. 81/9.51, 9.4

[56] References Cited

U.S. PATENT DOCUMENTS

| | | | |
|---|---|---|---|
| 2,844,056 | 4/1958 | Sladek | 81/9.51 |
| 3,645,156 | 2/1972 | Meyer | 81/9.51 |
| 4,009,738 | 3/1977 | Baba et al. | 81/9.51 |
| 4,275,619 | 6/1981 | Shimizu | 81/9.51 |

FOREIGN PATENT DOCUMENTS 0832641  5/1981  U.S.S.R. ............................. 81/9.51

Primary Examiner—Roscoe V. Parker
Attorney, Agent, or Firm—Fuller, Puerner & Hohenfeldt

[57] ABSTRACT

Precision spacers are inserted between the cutoff and stripping blades of an insulated conductor processing machine. The spacers have accurately controlled lengths that take into account the thickness of the various blades and that corresponds with different commonly specified strip lengths. The various strip lengths are accurately set by a single selected spacer. The spacers also assure that cooperating cutoff and stripping blades mesh properly when closing over the insulated conductor during the cutting and stripping process. The spacers have small slots on their top surfaces for receiving a small screwdriver. The slots and screwdriver facilitate handling the spacers in the machine at strip length changeover.

17 Claims, 2 Drawing Sheets

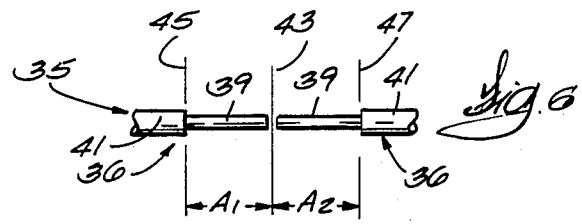
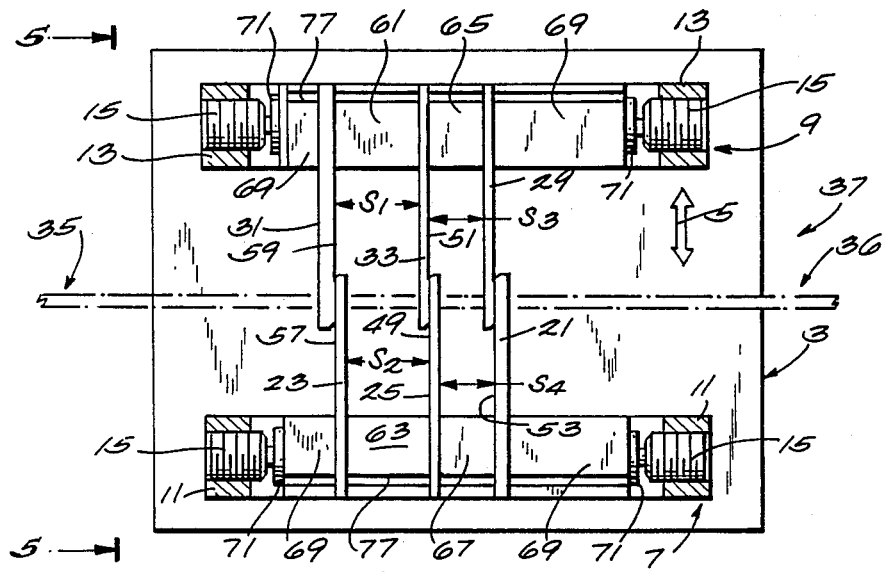
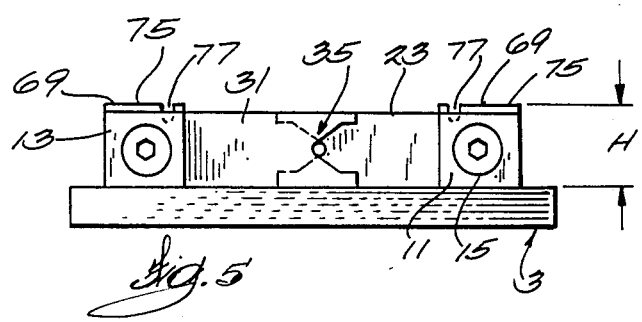
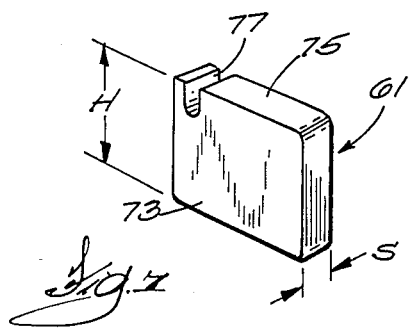

SPACERS FOR INSULATION CUTTERS

BACKGROUND OF THE INVENTION

1. Field of the Invention

This invention pertains to processing insulated conductors, and more particularly to apparatus for accurately controlling the strip lengths of insulated conductors.

2. Description of the Prior Art

The search for ever higher levels of production and uniformity in stripped insulated conductors has led the industry to investigate tooling components as a possible source of strip related failures. Tooling components include the spacers that have long been used to separate the cutoff and stripping blades of insulated conductor processing machines.

In FIG. 1, an insulated conductor 35 is shown composed of an inner conductor 39 covered with an insulation layer 41. A long length of insulated conductor 35 is severed into discrete pieces 36 along lines 43. The insulation 41 is shown stripped back from the line of severance 43 to the lines 45 and 47. The distances A1 and A2 between the severance line and the lines 45 and 47 are called the strip lengths. The strip lengths of the opposite ends of a cut insulated conductor piece 36 may, but need not, be equal. In some applications, the insulation on one of the ends of the cut pieces is not stripped.

Referring to FIGS. 2 and 3, a typical prior stripping and cutting station 1 of an insulated conductor processing machine is illustrated. The prior cutting and stripping station 1 includes a conventional machine frame schematically illustrated at 3. Mounted on the frame 3 for relative transverse reciprocation in the directions of arrow 5 are a front tool holder 7 and an independent rear tool holder 9. Each tool holder 7 and 9 includes a pair of longitudinally spaced apart upstanding shoulders 11 and 13, respectively. The shoulders 11 and 13 are threaded to receive set screws 15 or similar fasteners. Mounted between the respective inside faces 17 of the shoulders are a series of spacers and blades. The front tool holder carries spacers 19 together with known stripping blades 21 and 23 and cutoff blade 25. In applications that call for only one end of an insulated conductor piece 36 to be stripped of insulation 41, only one stripping blade, 21 or 23, is employed.

The rear tool holder 9 carries spacers 27 together with stripping blades 29 and 31 and a cutoff blade 33. The pairs of stripping blades 21, 29 and 23, 31 are located with respect to each other such that as the front and rear tool holders 7 and 9, respectively, reciprocate transversely in the directions of arrow 5, the stripping blades close over and slice the insulation 41 of the insulated conductor 35, which lies perpendicular to the direction of blade motion. Simultaneously, the cutting blades 25 and 33 cooperate to sever the insulated conductor along line 43. Subsequent longitudinal motion of the closed stripping blades relative to the fixed insulated conductor pulls the cut lengths of insulation from the inner conductor 39.

In theory, the cutting edge faces 49 and 51 of the cutoff blades 25 and 33, respectively, coincide to create the cutting line 43. See FIG. 1. Similarly, the cutting edge faces 53 and 55 of the blades 21 and 29, respectively, desirably coincide to form stripping line 47. The cutting edge faces 57 and 59 of the blades 23 and 31, respectively, theoretically coincide to create stripping line 45. To control the relative locations of the cutoff and stripping blades on the independent tool holders 7 and 9, as well as to set the strip lengths A1 and A2, spacers 19 and 27 have traditionally been inserted between the stripping and cutoff blades. The spacers are normally supplied in incremental lengths ranging from approximately 0.03 inches to approximately 0.50 inches.

Given the common strip lengths A1 and A2 required in various industrial applications and the available supply of spacers, different spacers of varying lengths must be stacked together to obtain the desired strip lengths. The stacking of several spacers results in a build-up of the tolerances of the individual spacers. Experience and investigation have shown that the selection of the various individual spacers is done at random, with no regard for the consequential meshing problems inherent in aligning a blade on one tool holder 7 or 9 with the corresponding blade on the other tool holder.

As a result of the stacked spacer tolerance problem, invariably the pairs of cooperating cutting edge faces 49, 51; 53, 55; and 57, 59 on the independent tool holders 7 and 9 do not coincide. As a result, one of two undesirable conditions occurs between a set of blades 21, 29; 25, 33; and 23, 31. The first undesirable condition is that there is interference between the corresponding blades upon closing. The presence of interference is reflected in wear patterns on the cutting edge faces of the blades. The wear patterns may range from faint discoloration to severe gouges. To permit blade closing despite the interference, the blade leading ends are manufactured with bevels 37. Interfering blades deflect each other as they close, with the deflection being governed by the blade thickness. Too much interference may cause the blades to break.

The second undesirable condition that may be caused by tolerance stack-up of the spacers 19 and 27 is the opposite of blade interference. Instead of interference, air gaps may be formed between the cutting edge faces of a cooperating pair of blades. With air gaps between the pairs of stripping blades 21, 29 and 23, 31, the slice made on one side of the insulated conductor insulation 41 by one cutting blade does not meet the slice on the opposite side made by the other blade. Consequently, the insulation is torn when the closed stripping blades are moved longitudinally with respect to the stationary insulated conductor 35 to strip the insulation from the inner conductor 39. The remaining insulation then has a jagged and uneven end surface along strip lines 45 or 47. Extensive experimentation has shown that the insulation tearing force is directly proportional to the air gap between closed blades. Further, the increase in tearing force with air gap is linear. Depending on insulation type, excessive force can cause insulation stretching before breaking and thereby result in a strip length A1 or A2 that is shorter than desired. In addition, the jagged or stretched insulation can slip under the conductor crimp of a terminal fitting applied to the stripped conductor wire 39. Observations of the spacer problems indicate that the air gap problem is more important than the interference problem in causing strip related failures.

Another disadvantage of spacers 19 and 27 of the prior processing stations 1 is that historically their heights and widths have closely coincided with the machine tool holder cavities. In other words, the tops of the spacers have been flush with the tops of the tool holders 7 and 9. That design has required a very cumbersome and aggravating procedure for changing blade set ups, because it is awkward and difficult for the machine operator to remove the spacers from the tool holders with his fingers.

Thus, a need exists for a solution to the problems of insulated conductor strip related failures as well as to the inconvenience of prior blade setup procedures.

SUMMARY OF THE INVENTION

In accordance with the present invention, an insulated conductor processing machine is provided that solves the problem of strip related failures due to improperly meshing cutoff and stripping blades. This is accomplished by apparatus that includes a plurality of single component members that accurately locate the blades for proper meshing and for producing accurate strip lengths.

Each single component member consists of a single spacer. Each spacer has a length that is designed to produce a particular strip length. Commonly used strip lengths normally range from approximately 3 mm to 15.5 mm, and from about 0.13 inches to 0.50 inches.

The spacer lengths are further designed to take into account the thickness of various blades in the tooling setup. The spacer length required for a particular strip length is equal to the strip length minus the thickness of one of the blades. The particular blade thickness to be subtracted is dependent on its position in the tooling setup. By knowing the blade thickness and desired strip length, the machine operator can select the single correct spacer from a supply without difficulty. The necessity of calculations or trial and error to determine a combination of spacers that only approximates the correct overall length is eliminated.

To assure accurate strip length and proper meshing of the cooperating cutoff and stripping blades, the spacers have tight length tolerances of approximately ±0.001 inch. In addition, the spacer end faces are flat and parallel to within ±0.0003 inch. The spacers are preferably made of through-hardened steel, thus eliminating the development of burrs and facial flaws that may affect their dimensional integrity.

Further in accordance with the present invention, the spacers are manufactured with heights that extend beyond the insulated conductor processing machine tool holder cavity. The spacers are thus much easier to handle by the machine operator during changeover from one strip length to another, thereby reducing unproductive downtime. To further increase the convenience of the spacers of the present invention, each spacer is fabricated with a small slot in one edge surface. The spacers are installed in the tooling setup with the slotted surfaces at the top. At changeover, a small screwdriver or similar tool is inserted into the slot to tip the spacer into a position where it is easily grasped by the operator's fingers.

Other objects, aims, and advantages of the invention will become apparent to those skilled in the art from the disclosure.

BRIEF DESCRIPTION OF THE DRAWINGS

FIG. 4 is a top view of a stripping and cutting station of an insulated conductor processing machine according to the present invention;

FIG. 5 is a view taken along lines 5—5 of FIG. 4;

FIG. 6 is a side view of a stripped and severed insulated conductor; and

FIG. 7 is a perspective view of a typical spacer for an insulated conductor processing machine according to the present invention.

DETAILED DESCRIPTION OF THE INVENTION

Figure 2:
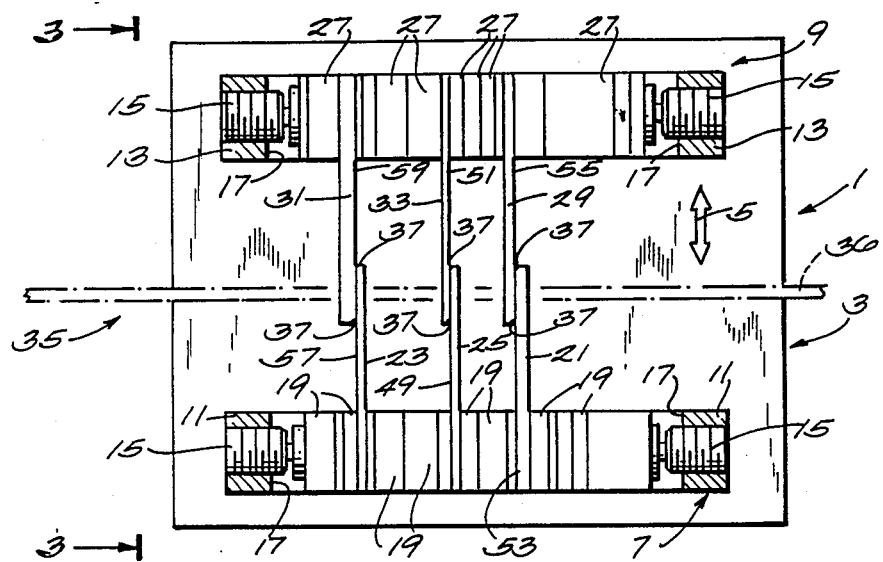
FIG. 2 is a top view of a portion of an insulated conductor processing machine showing a prior art stripping and cutting station.
Figure 3:
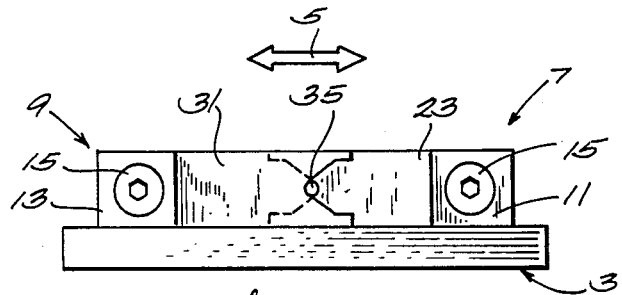
FIG. 3 is a view taken along lines 3—3 of FIG. 2.
Figure 1:
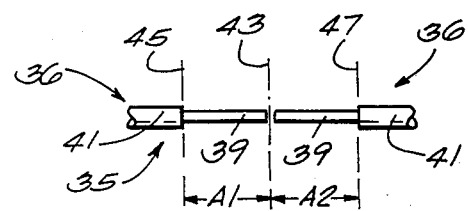
FIG. 1 is a side view of a stripped and severed insulated conductor.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 4–6, a stripping and cutting station 37 of an insulated conductor processing machine is illustrated that includes the present invention. At the stripping and cutting station 37, an insulated conductor 35 is severed transversely at line 43 by a pair of cutoff blades 25 and 33. The insulation 41 is sliced and stripped at lines 45 and 47 by respective pairs of stripping blades 21, 29 and 23, 31. The blades 25, 33; 21, 29; and 23, 31 are mounted on independent front and rear tool holders 7 and 9, respectively. The tool holders reciprocate within machine frame 3 in a transverse manner, as indicated by arrow 5, to open and close over the insulated conductor to slice the insulation and to sever the inner wire 39. The front and rear tool holders include upstanding shoulders 11 and 13, respectively.

In accordance with the present invention, the insulated conductor strip lengths A1 and A2 are accurately and conveniently set by a single spacer in conjunction with each stripping blade 21, 23, 29, and 31 on the respective tool holders 7 and 9. The spacers are designed to accommodate the thickness of the cutoff and stripping blades such that the spacer-blade combinations produce the exact strip length required. Moreover, the spacers are designed such that the blades on one of the tool holders mesh with the cooperating blades on the other tool holder without interference or air gaps.

Engineering design of the spacers of the present invention begins by choosing severance line 43 as the reference line. That line is formed by the common plane of the cutting edge faces 49 and 51 of cutoff blades 25 and 33, respectively. To obtain a strip length A1, a spacer 61 according to the present invention is inserted between the blades 31 and 33 on tool holder 9, and a spacer 63 is inserted in the tool holder 7 between the blades 23 and 25. The spacer 61 has a length S1 that is equal to the desired strip length a1 minus the thickness of the blade 33. The length S2 of the spacer 63 is equal to the strip length A1 minus the thickness of the blade 23.

The spacer lengths S1 and S2 are accurately controlled to ±0.001 inch. In addition, the spacer end faces are flat and parallel to within ±0.0003 inch. Those tight tolerances, plus the fact that only one spacer is used in combination with each stripping blade for a given strip length, results in almost perfect coincidence between cutting faces 57 and 59 of the blades 23 and 31, respectively, to create the cutting line 45. Consequently, the blades do not interfere with each other upon closing. At the same time, there is no air gap between the cutting edge faces 57 and 59. The result is a continuous slicing around the insulation 41, and the problem of insulation tearing upon subsequent longitudinal stripping action by the tool holders is eliminated.

Assuming both ends of a cut insulated conductor piece 36 are to be stripped of insulation 41, as shown in FIGS. 4-6, a spacer 65 is inserted between cutoff blade 33 and stripping blade 29 on tool holder 9. The length S3 of the spacer 65 is designed and manufactured to be equal to the strip length A2 minus the thickness of the stripping blade 29. Similarly, a spacer 67 is inserted in the front tool holder 7 between the cutoff blade 25 and the stripping blade 21. The length S4 of the spacer 67 is equal to the strip length A2 minus the thickness of the cutoff blade 25. With the spacers 65 and 67 in place, the stripping blade cutting edge faces 53 and 55 exactly coincide to produce the insulation cutting line 47. Thus, the spacers 61, 63, 65, and 67 cooperate with the various cutoff and stripping blades to both accurately produce the desired strip lengths and to assure proper blade meshing.

To rigidly retain the spacers of the present invention, as well as the cutoff and stripping blades, in place on the tool holders 7 and 9, the spacers and blades are tightly gripped between the set screws 15 on the tool holder shoulders 11 and 13, respectively. An end spacer according to the present invention may, but need not, be used between the various stripping blades and the set screws. That is, ordinary end blocks of convenient length, bearing reference numerals 69, may be employed if desired. If precision ground spacers according to the present invention are used as the end blocks 69, a pad 71 of relatively soft material is preferably interposed between each set screw and the associated end spacer.

The spacers of the present invention can be supplied in lengths which, when used in conjunction with commercially available cutoff and stripping blades 21, 23, 25, 29, 31, and 33, accurately produce any desired strip length. To accommodate the most common strip lengths used by various industries, it is anticipated that the spacers will be supplied in kits that contain different quantities of selected lengths S, FIG. 7. For example, a kit may contain one or more spacers corresponding to the following strip lengths: 3 mm, 5.5 mm, 6.0 mm, 6.5 mm, 8 mm, 9.5 mm, 12.5 mm, 16.0 mm, and 25 mm. Other kits may contain spacers corresponding to each of the following English measurement strip lengths: 0.13 inch, 0.18 inch, 0.25 inch, 0.31 inch, 0.38 inch, 0.50 inch, 0.63 inch, 0.75 inch, 0.88 inch, and 1.00 inch. In that manner, the single proper spacer associated with each blade for a desired strip length A1 or A2 is immediately available to the machine operator, who can quickly select the spacer from the kit and insert it into the tooling setup with minimum machine downtime.

To assure long service life, the spacers of the present invention are manufactured from throughhardened steel. The selection of that material eliminates the development of burrs or other flaws on the spacer end faces 73 that could affect their accuracy.

Further in accordance with the present invention, the spacers of the present invention are designed so as to be much easier to replace at changeover from one strip length A1 or A2 to another strip length. For that purpose, the spacers are designed and manufactured with a height dimension H that is greater than the height of the machine cavity in which the tool holders 7 and 9 are recessed. Consequently, the spacers extend above the cutoff and stripping blades and shoulders 11 and 13. Moreover, the top surface 75 of each spacer is formed with a slot 77 that preferably extends between the two end faces 73. The slots 77 are designed to receive a small screwdriver or similar tool, which can tip the spacer into a position for quick removal by the machine operator. As a result, unproductive machine setup time at strip length changeover is minimized.

Without further description, it is thought that the advantages to be gained from the disclosed embodiment of the present invention will be apparent to those skilled in the art. Furthermore, it is contemplated that various modifications and changes may be made to the precision spacers of the present invention within the scope of the appended claims without departing from the spirit of the invention.

I claim:

1. A machine for cutting a length of insulated conductor into discrete pieces and for stripping a predetermined strip length of insulation from at least one end of the cut pieces comprising:
   a. a frame defining a cavity;
   b. front and rear tool holders located within the frame cavity and adapted to reciprocate in opposite directions and in timed relationship with each other;
   c. a pair of cutoff blades mounted in a respective tool holder for reciprocation therewith to cooperatively mesh and sever the insulated conductor at a predetermined location therealong;
   d. a first pair of stripping blades, a first stripping blade being mounted to each tool holder for reciprocation therewith;
   e. a first precision spacer having imperforate accurately spaced opposed end faces interposed between and in end facing contact with the cutoff and stripping blades on the front tool holder for solely cooperating therewith to accurately set the predetermined strip length on the front tool holder; and
   f. a second precision spacer having imperforate accurately spaced opposed end faces interposed between and in end facing contact with the cutoff and first stripping blades on the rear tool holder for sole cooperation therewith to accurately set the predetermined strip length on the rear tool holder and to cause the first stripping blade on the rear tool holder to mesh with the first stripping blade on the front tool holder without interference or air gap,
   so that the stripping blades cutting edge faces coincide to properly slice the insulated conductor insulation.

2. The machine of claim 1 wherein the spacer on the front tool holder has a length equal to the predetermined strip length minus the thickness of the first stripping blade on the front tool holder, and wherein the spacer on the rear tool holder has a length equal to the predetermined strip length minus the thickness of the cutoff blade on the rear tool holder.

3. The machine of claim 1 wherein the lengths of the spacers are controlled to a tolerance of approximately 0.001 inch, and wherein the spacer end faces are flat and parallel to a tolerance of approximately 0.0003 inch to thereby assure accurate strip lengths and proper blade meshing.

4. The machine of claim 1 further comprising:
   a. a second pair of stripping blades, a second stripping blade being mounted to each tool holder on the opposite sides of the respective cutoff blades as the first pair of stripping blades;

b. a third precision spacer interposed between the cutoff blade and the second blade on the front tool holder to accurately set a second predetermined insulated conductor strip length on the front tool holder; and c. a fourth precision spacer interposed between the cutoff blade and second stripping blade on the rear tool holder to accurately set the second predetermined strip length on the rear tool holder and to assure proper meshing of the second stripping blade on the rear tool holder with the second stripping blade on the front tool holder, so that the cutting edge faces of the second pair of stripping blades coincide to slice the insulated conductor insulation without interference or air gap.

5. The machine of claim 4 wherein the third precision spacer has a length equal to the second predetermined strip length minus the thickness of the second cutoff blade on the front tool holder, and wherein the fourth precision spacer has a length equal to the second predetermined strip length minus the thickness of the second stripping blade on the rear tool holder.

6. A machine for cutting a length of insulated conductor into discrete pieces and for stripping a predetermined strip length of insulation from at least one end of the cut pieces comprising:

a. a frame defining a cavity;

b. front and rear tool holders located within the frame cavity and adapted to reciprocate in opposite directions and in timed relationship with each other;

c. a pair of cutoff blades mounted in a respective tool holder for reciprocation therewith to cooperatively mesh and sever the insulated conductor at a predetermined location therealong;

d. a first pair of stripping blades, a first stripping blade being mounted to each tool holder for reciprocation therewith;

e. a first precision spacer interposed between the cutoff and stripping blades on the front tool holder to accurately set the predetermined strip length on the front tool holder; and f. as second precision spacer interposed between the cutoff and first stripping blades on the rear tool holder to accurately set the predetermined strip length on the rear tool holder and to cause the first stripping blade on the rear tool holder to mesh with the first stripping blade on the front tool holder without interference or air gap, wherein the spacers extend beyond the machine cavity to thereby render them easily accessible to facilitate replacement during changeovers to different strip lengths, so that the stripping blades cutting edge faces coincide to properly slice the insulated conductor insulation.

7. A machine for cutting a length of insulated conductor into discrete pieces and for stripping a predetermined strip length of insulation from at least one end of the cut pieces comprising:

a. a frame defining a cavity;

b. front and rear tool holders located within the frame cavity and adapted to reciprocate in opposite directions and in timed relationship with each other;

c. a pair of cutoff blades mounted in a respective tool holder for reciprocation therewith to cooperatively mesh and sever the insulated conductor at a predetermined location therealong;

d. a first pair of stripping blades, a first stripping blade being mounted to each tool holder for reciprocation therewith;

e. a first precision spacer interposed between the cutoff and stripping blades on the front tool holder to accurately set the predetermined strip length on the front tool holder; and f. a second precision spacer interposed between the cutoff and first stripping blades on the rear tool holder to accurately set the predetermined strip length on the rear tool holder and to cause the first stripping blade on the rear tool holder to mesh with the first stripping blade on the front tool holder without interference or air gap, wherein:

g. each spacer is formed with a slot in one edge surface, the slot extending between the spacer end faces and being of a size and shape to receive a small tool; and h. the spacers are inserted in the tool holders with the slotted surfaces upwardly, so that the spacers may be easily grasped and quickly replaced at strip length changeover by tipping the spacers with a small tool inserted into the slots.

8. In a machine for processing an insulated conductor and having front and rear tool holders adapted to reciprocate in a direction transverse to the insulated conductor, improved tooling for severing the insulated conductor into discrete pieces and for stripping the insulation from the inner wire comprising:

a. a pair of cutoff blades, one cutoff blade being mounted in each tool holder and located therein to mesh with the other cutting blade and to close over the insulated conductor to sever it at predetermined locations therealong;

b. a pair of first stripping blades, one first stripping blade being mounted in each tool holder and located therein to mesh with the other first stripping blade and to close over the insulated conductor to slice the insulation thereon;

c. a first precision spacer having imperforate accurately spaced opposed end faces with a first predetermined length therebetween inserted between and in end facing contact with the cutoff blade and first stripping blade on the front tool holder for sole cooperation therewith to accurately set a first predetermined insulated conductor strip length on the front tool holder; and d. a second precision spacer having imperforate accurately spaced opposed end faces with a second predetermined length therebetween inserted between and in end facing contact with the cutoff blade and first stripping blade on the rear tool holder for sole cooperation therewith to set the first predetermined strip length on the rear tool holder and to accurately and exclusively locate the cutting edge faces of the first stripping blades with respect to each other, so that the stripping blades mesh and slice the insulated conductor insulation without interference or air gap.

9. The improved tooling of claim 8 wherein the spacer on the front tool holder has a length equal to the predetermined strip length minus the thickness of the stripping blade on the front tool holder, and wherein the spacer of the rear tool holder has a length equal to the predetermined strip length minus the thickness of the cutoff blade on the rear tool holder.

10. The improved tooling of claim 8 wherein the length of the first and second spacers are controlled to a tolerance of approximately ±0.001 inch, and wherein the spacers end faces are flat and parallel to a tolerance of approximately 0.0003 inch to thereby assure accurate strip lengths and proper blade meshing.

11. The improved tooling of claim 8 further comprising:
 a. a second pair of stripping blades, one second stripping blade being mounted to each tool holder on the opposite side of the respective cutoff blades as the first pair of stripping blades;
 b. a third precision spacer having imperforate accurately spaced opposed end faces with a third predetermined length therebetween interposed between and in end facing contact with the cutoff blade and the second stripping blade on the front tool holder for sole cooperation therewith to accurately set a second predetermined insulated conductor strip length on the front tool holder; and
 c. a fourth precision spacer having imperforate accurately spaced opposed end faces with a fourth predetermined length therebetween interposed between and in end facing contact with the cutoff blade and the second stripping blade on the rear tool holder for sole cooperation therewith to accurately set the second predetermined strip length on the rear tool holder and to assure proper meshing of the second stripping blade on the rear tool holder with the second stripping blade on the front tool holder,
 so that the cutting edge faces of the second pair of stripping blades coincide to slice the insulated conductor insulation without interference or air gap.

12. The improved tooling of claim 11 wherein the third precision spacer has a length equal to the second predetermined strip length minus the thickness of the cutoff blade on the front tool holder, and wherein the fourth precision spacer has a length equal to the second predetermined strip length minus the thickness of the second stripping blade on the rear tool holder.

13. In a machine for processing an insulated conductor and having front and rear tool holders adapted to reciprocate in a direction transverse to the insulated conductor, improved tooling for severing the insulated conductor into discrete pieces and for stripping the insulation from the inner wire comprising:
 a. a pair of cutoff blades, one cutoff blade being mounted in each tool holder and located therein to mesh with the other cutting blade and to close over the insulated conductor to sever it at predetermined locations therealong;
 b. a pair of first stripping blades, one first stripping blade being mounted in each tool holder and located therein to mesh with the other first stripping blade and to close over the insulated conductor to slice the insulation thereon;
 c. a first precision spacer inserted between the cutoff blade and first stripping blade on the front tool holder, the first spacer having a length selected to accurately set a first predetermined insulated conductor strip length on the front tool holder; and
 d. a second precision spacer inserted between the cutoff blade and first stripping blade on the rear tool holder, the second stripping blade having a length selected to set the first predetermined strip length on the rear tool holder and to accurately locate the cutting edge faces of the second stripping blades with respect to each other,
 wherein the spacers have top surfaces that extend beyond the tops of the front and rear tool holders to thereby facilitate manual spacer replacement at strip length changeover.
 so that the stripping blades mesh and slice the insulated conductor insulation without interference or air gap.

14. In a machine for processing an insulated conductor and having front and rear tool holders adapted to reciprocate in a direction transverse to the insulated conductor, improved tooling for severing the insulated conductor into discrete pieces and for stripping the insulation from the inner wire comprising:
 a. a pair of cutoff blades, one cutoff blade being mounted in each tool holder and located therein to mesh with the other cutting blade and to close over the insulated conductor to sever it at predetermined locations therealong;
 b. a pair of first stripping blades, one first stripping blade being mounted in each tool holder and located therein to mesh with the other first stripping blade and to close over the insulated conductor to slice the insulation thereon;
 c. a first precision spacer inserted between the cutoff blade and first stripping blade on the front tool holder, the first spacer having a length selected to accurately set a first predetermined insulated conductor strip length on the front tool holder; and
 d. a second precision spacer inserted between the cutoff blade and first stripping blade on the rear tool holder, the second stripping blade having a length selected to set the first predetermined strip length on the rear tool holder and to accurately locate the cutting edge faces of the second stripping blades with respect to each other, wherein:
 e. each spacer has a top surface that defines a slot; and
 f. the spacers are interposed between the cutoff and stripping blades with the slotted surfaces facing upwardly,
 so that a worker can tip the spacers by inserting a small tool into the spacer slots to thereby facilitate spacer replacement at strip length changeover.

15. A precision spacer for use in combination with a cutoff blade and a stripping blade in a tooling setup of an insulated conductor processing machine to set a predetermined strip length comprising an imperforate generally rectangular parallelopiped having opposed end faces and adapted to be interposed between and in end facing contact with the cutoff and stripping blades, the spacer end faces defining a length selected such that the spacer cooperates solely with the cutoff and stripping blades to accurately set the predetermined strip length between the cutoff and stripping blades and to account for the thickness of a cutoff or stripping blade, the particular cutoff or stripping blade being dependent on the relative positions of the spacer and blade in the processing machine tooling setup, the spacer having a length accurately equal to the predetermined strip length minus the thickness of the particular blade, the spacer length further being selected to assure proper meshing of the cutoff and stripping blades with respective similar cooperating blades for cutting and stripping the insulated conductor, the spacer length being accurately controlled to approximately ±0.001 inch, and the spacer end faces being flat and parallel to within approximately ±0.0003 inch.

16. A precision spacer for use in combination with a cutoff blade and a stripping blade in an insulated conductor processing machine to set a predetermined strip length comprising a generally rectangular parallelopiped having a length selected to accurately set the predetermined strip length between the cutoff and stripping blades and to account for the thickness of a cutoff or stripping blade, the particular cutoff or stripping blade being dependent on the relative positions of the spacer and blade in the processing machine tooling setup, the spacer having a length equal to the predetermined strip length minus the thickness of the particular blade, the spacer length further being selected to assure proper meshing of the cutoff and stripping blades with respective similar cooperating blades for cutting and stripping the insulated conductor, the spacer length being accurately controlled to approximately +0.001 inch, and the spacer end faces being flat and parallel within approximately +0.0003 inch, wherein the precision spacer has an edge surface that defines a slot therein having a size and shape adapted to receive a small tool, so that the tool may engage the spacer slot to tip the spacer into a position for easy replacement in the processing machine.

17. The spacer of claim 16 wherein the slot extends along the edge surface between the spacer end faces.

* * * * *